(12) United States Patent
Platzer, Jr.

(10) Patent No.: US 6,315,419 B1
(45) Date of Patent: Nov. 13, 2001

(54) AUTOMOTIVE REARVIEW MIRROR HAVING A MAIN VIEWING SECTION AND AN AUXILIARY BLINDZONE-VIEWING SECTION

(76) Inventor: George Erhardt Platzer, Jr., 424 Cypress Rd., Rochester Hills, MI (US) 48309

( * ) Notice: Subject to any disclaimer, the term of this patent is extended or adjusted under 35 U.S.C. 154(b) by 0 days.

(21) Appl. No.: 09/551,676

(22) Filed: Apr. 24, 2000

(51) Int. Cl.$^7$ ....................................................... G02B 5/08
(52) U.S. Cl. .................... 359/854; 359/855; 359/858; 359/862
(58) Field of Search ...................... 359/854, 855, 359/858, 862, 863, 864, 865, 866, 868, 870

(56) References Cited

U.S. PATENT DOCUMENTS

| | | |
|---|---|---|
| Re. 17,274 | 4/1929 | Porter . |
| 1,114,559 | 10/1914 | Weed . |
| 1,672,559 | 6/1928 | Doble . |
| 2,135,262 | 1/1938 | Schmacher . |
| 2,636,419 | 4/1953 | Kerr . |
| 2,778,273 | 1/1957 | Fellmeth . |
| 2,911,177 | 11/1959 | West . |
| 3,131,250 | 4/1964 | Ely . |
| 3,146,296 | 8/1964 | Fischer . |
| 3,170,985 | 2/1965 | Katulich . |
| 3,175,463 | 3/1965 | Seashore . |
| 3,267,806 | 8/1966 | Azegami . |
| 3,337,285 | 8/1967 | Travis . |
| 3,338,655 | 8/1967 | Young . |
| 3,375,053 | 3/1968 | Ward . |
| 3,389,952 | 6/1968 | Tobin, Jr. . |
| 3,404,935 | 10/1968 | Creager . |
| 3,408,136 | 10/1968 | Travis . |
| 3,424,517 | 1/1969 | Budreck . |
| 3,563,638 | 2/1971 | Panozzo . |
| 3,610,739 | 10/1971 | Seashore . |
| 3,667,833 | 6/1972 | Baldwin, Sr. . |
| 3,764,201 | 10/1973 | Haile . |
| 3,826,563 | 7/1974 | Davis . |
| 3,881,811 | 5/1975 | French . |
| 3,909,117 | 9/1975 | Takahashi et al. . |
| 4,200,359 | 4/1980 | Lawson . |
| 4,223,983 | 9/1980 | Bloom . |
| 4,268,121 | 5/1981 | Jitsumori . |
| 4,293,191 | 10/1981 | Kim . |
| 4,303,308 | 12/1981 | Kobrin . |
| 4,306,770 | 12/1981 | Marhauer . |
| 4,311,363 | 1/1982 | Marsalka et al. . |
| 4,325,609 | 4/1982 | Alford . |
| 4,350,412 | 9/1982 | Steenblik et al. . |

(List continued on next page.)

OTHER PUBLICATIONS

George Platzer, The Geometry of Automotive Rearview Mirrors—Why Blind Zones Exist and Strategies to Overcome Them, Society of Automotive Engineers, Technical Paper Series, #950601, 1995.

* cited by examiner

Primary Examiner—Mohammad Sikder
(74) Attorney, Agent, or Firm—Brooks & Kushman P.C.

(57) ABSTRACT

A composite mirror adapted for use as an outside rearview mirror of a motor vehicle includes a main or primary viewing mirror and an auxiliary blindzone viewing mirror juxtaposed to expose the vehicle blindzone to the vehicle operator. The main viewing mirror is generally of unit magnification. The auxiliary mirror is composed of a planar array of reflecting facets mimicking a convex mirror.

24 Claims, 10 Drawing Sheets

U.S. PATENT DOCUMENTS

| | | | |
|---|---|---|---|
| 4,436,372 | * 3/1984 | Schmidt et al. | 359/856 |
| 4,439,013 | 3/1984 | Hagn et al. . | |
| 4,526,446 | 7/1985 | Adams . | |
| 4,549,786 | 10/1985 | Albers et al. . | |
| 4,575,202 | 3/1986 | McGuire . | |
| 4,629,296 | 12/1986 | White . | |
| 4,674,849 | 6/1987 | Stewart . | |
| 4,674,850 | * 6/1987 | Blom | 359/856 |
| 4,715,701 | 12/1987 | Urban . | |
| 4,824,231 | 4/1989 | Quintana . | |
| 4,828,379 | 5/1989 | Parsons et al. . | |
| 4,859,046 | 8/1989 | Traynor et al. . | |
| 4,913,542 | 4/1990 | Adolfsson . | |
| 4,917,485 | 4/1990 | Baldwin, Sr. . | |
| 4,929,074 | 5/1990 | Urban . | |
| 4,989,964 | 2/1991 | Meise . | |
| 5,005,962 | 4/1991 | Edelman . | |
| 5,022,747 | 6/1991 | Polanyi et al. . | |
| 5,033,835 | 7/1991 | Platzer, Jr. . | |
| 5,044,739 | 9/1991 | do Espirito Santo . | |
| 5,050,977 | 9/1991 | Platzer, Jr. . | |
| 5,080,492 | 1/1992 | Platzer, Jr. . | |
| 5,115,352 | 5/1992 | do Espirito Santo . | |
| 5,166,833 | 11/1992 | Shyu . | |
| 5,237,458 | 8/1993 | Polanyi et al. . | |
| 5,237,459 | 8/1993 | Strauss . | |
| 5,295,021 | 3/1994 | Swanson . | |
| 5,296,973 | 3/1994 | Burke . | |
| 5,424,875 | 6/1995 | Davis, II . | |
| 5,432,643 | 7/1995 | Huang . | |
| 5,517,367 | 5/1996 | Kim et al. . | |
| 5,594,593 | 1/1997 | Milner . | |
| 5,644,442 | 7/1997 | Lemere . | |
| 5,691,855 | 11/1997 | Lupkas . | |
| 5,722,836 | * 3/1998 | Yunker | 434/272 |
| 5,784,211 | 7/1998 | Mingledorff . | |
| 5,790,327 | 8/1998 | Lee et al. . | |
| 5,805,367 | 9/1998 | Kanazawa . | |
| 5,847,889 | * 12/1998 | Komiyama et al. | 359/851 |

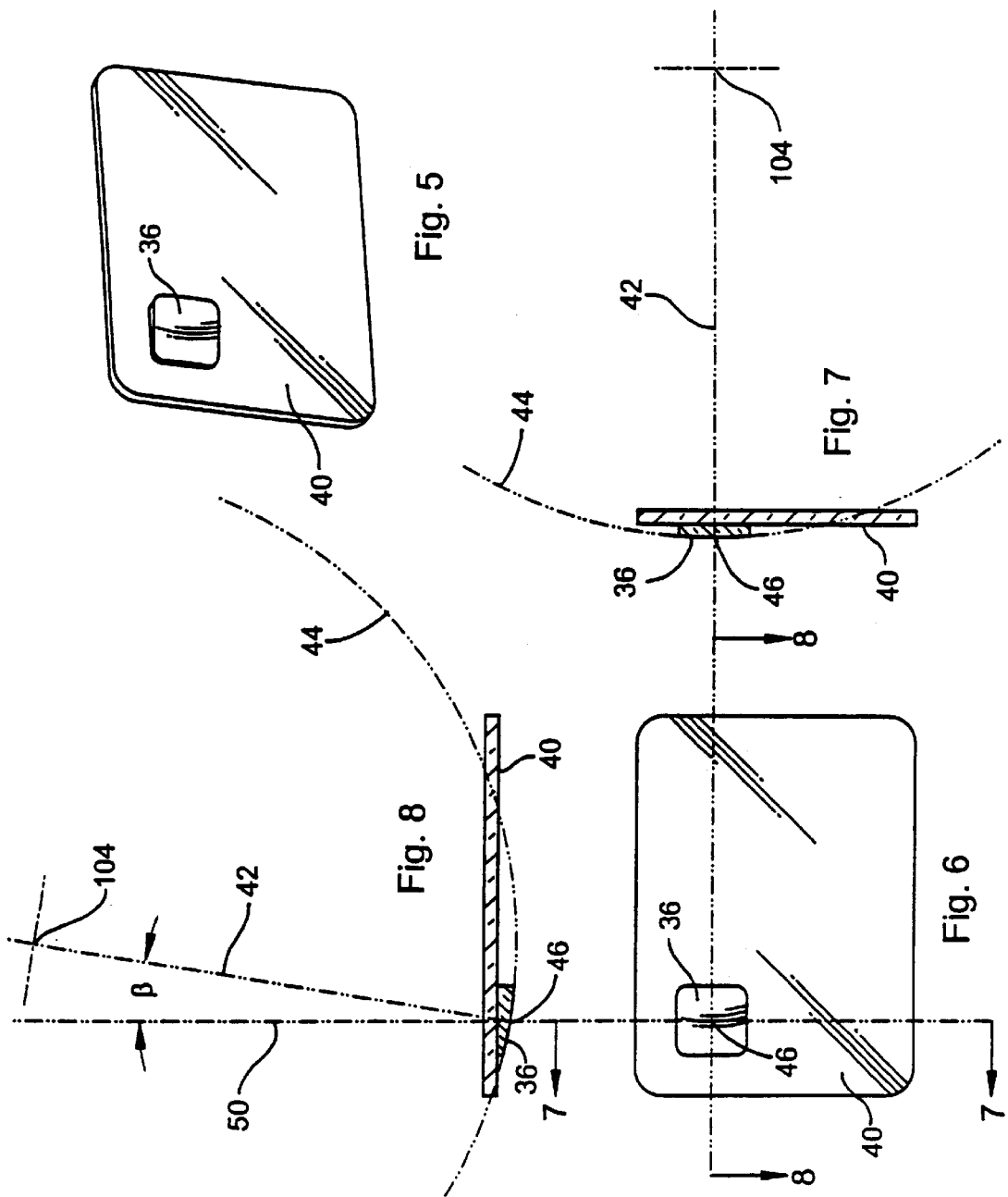

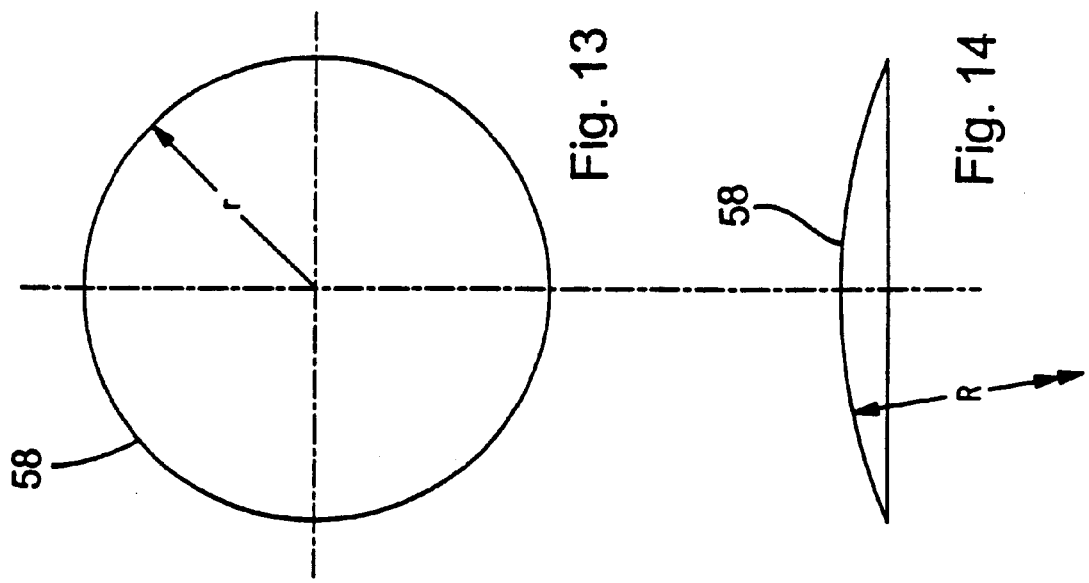
Fig. 13
Fig. 14
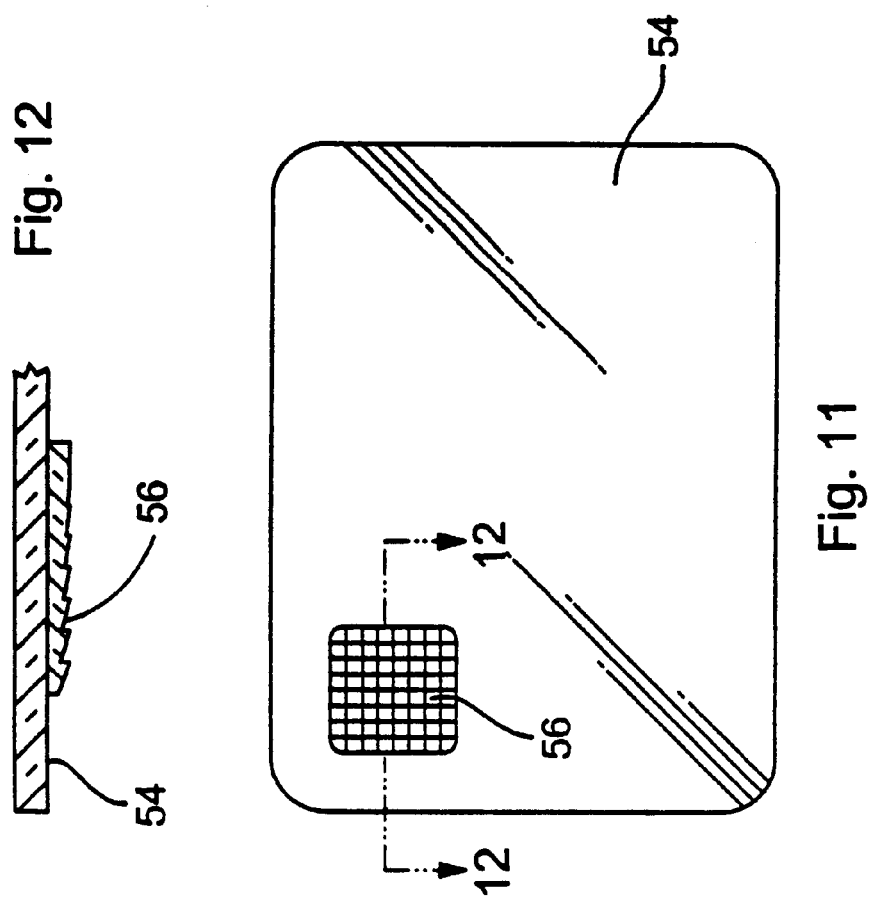
Fig. 12
Fig. 11

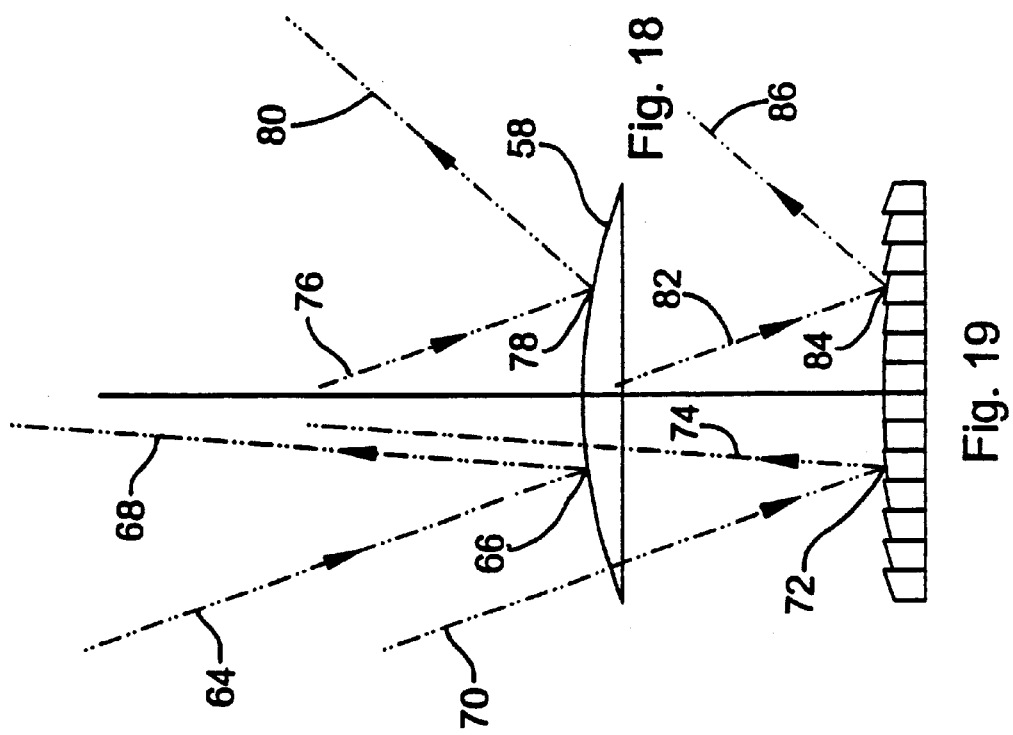
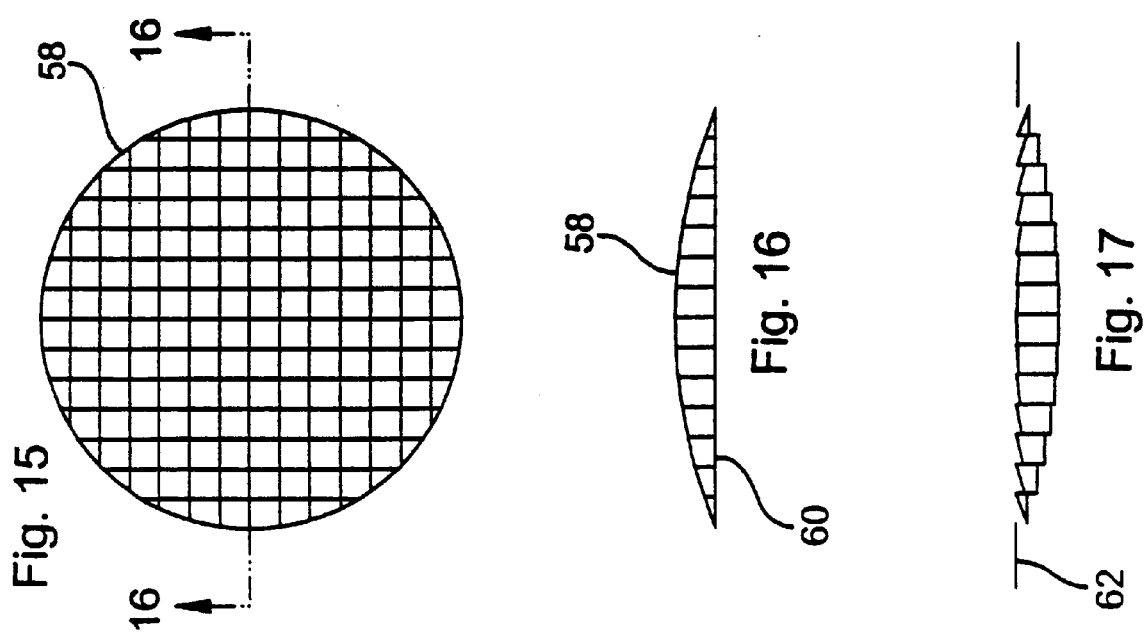

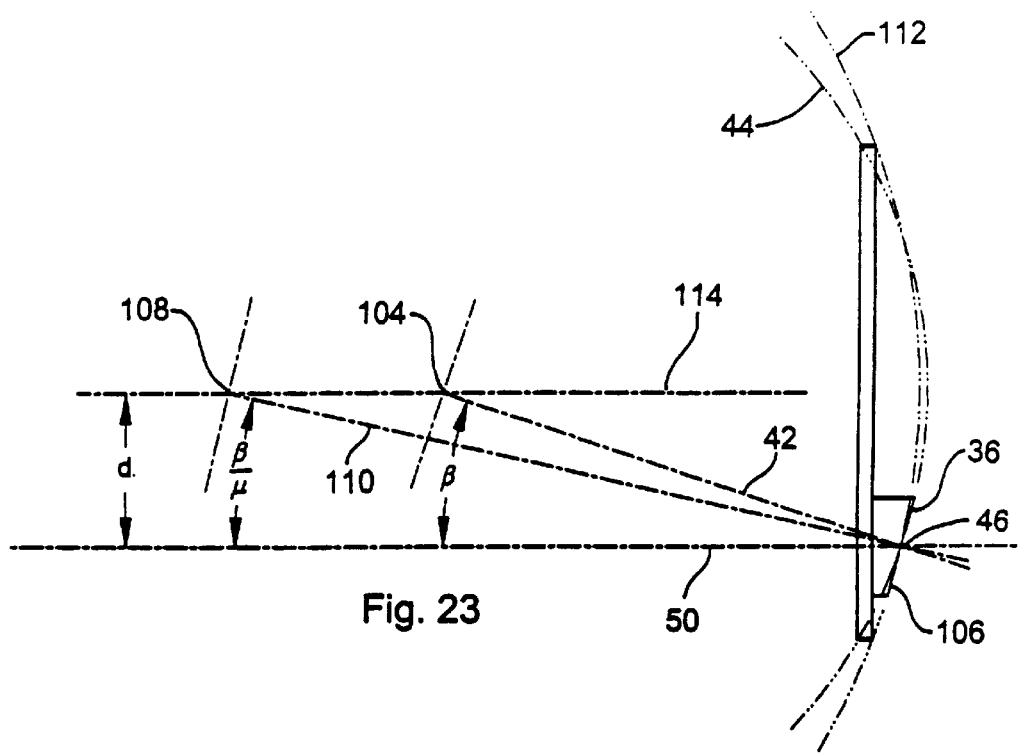
Fig. 23
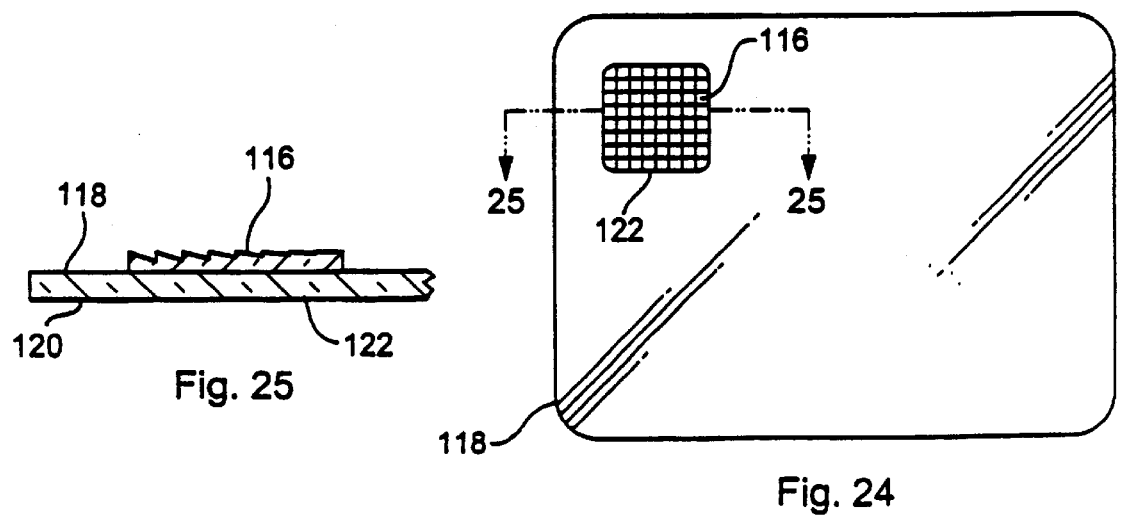
Fig. 25
Fig. 24

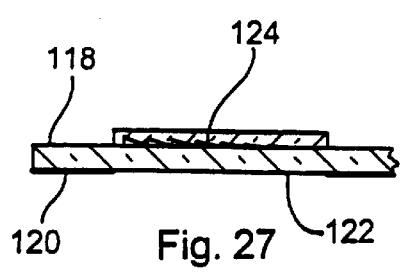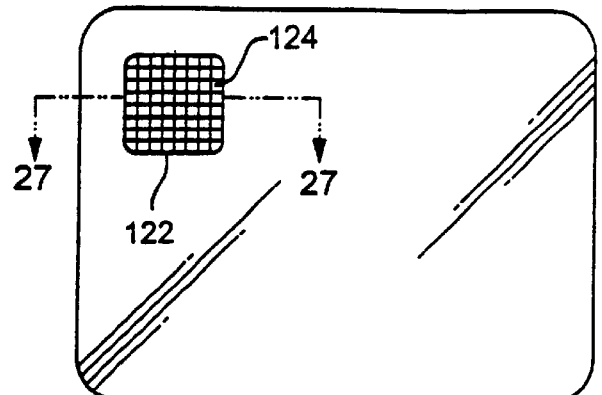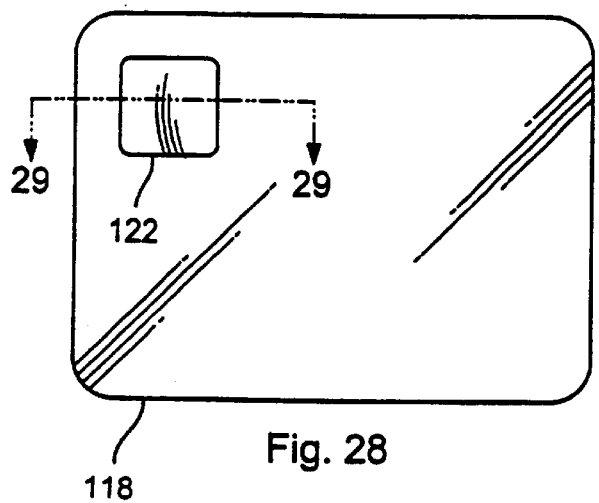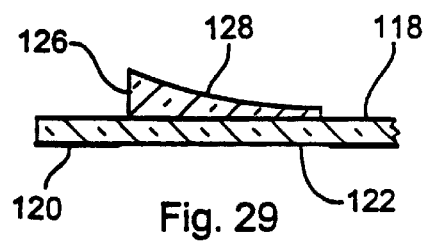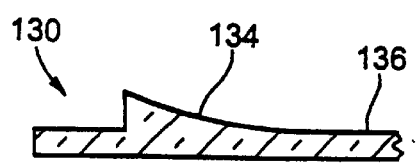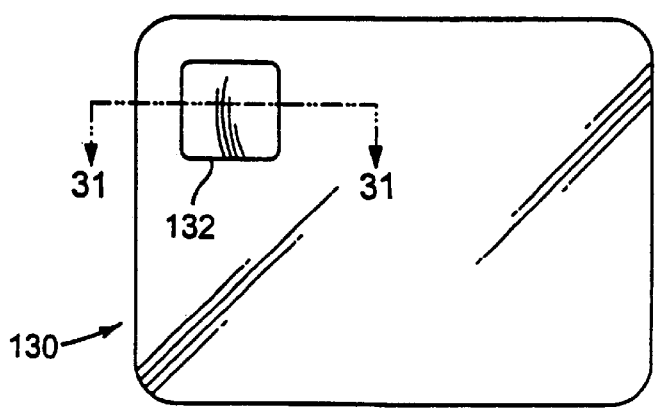

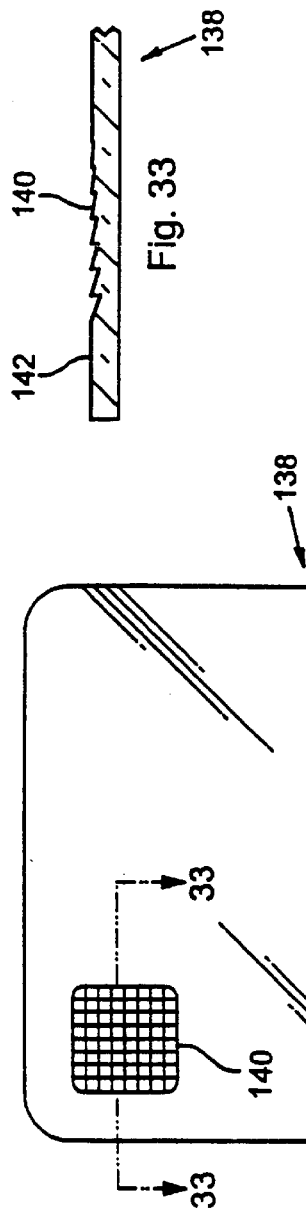
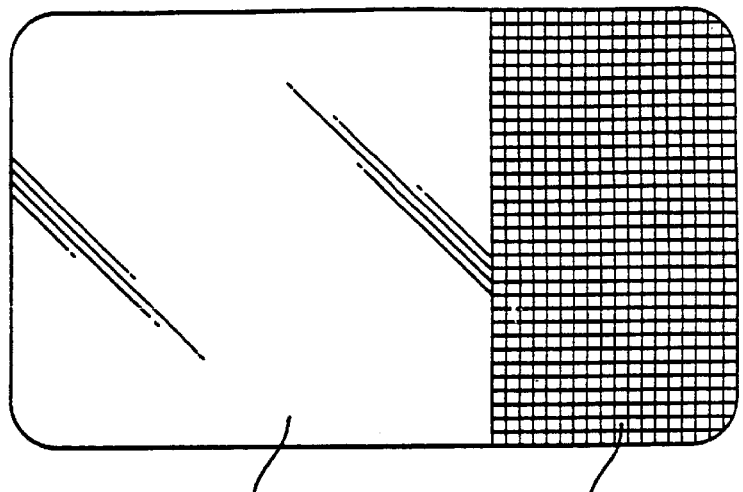
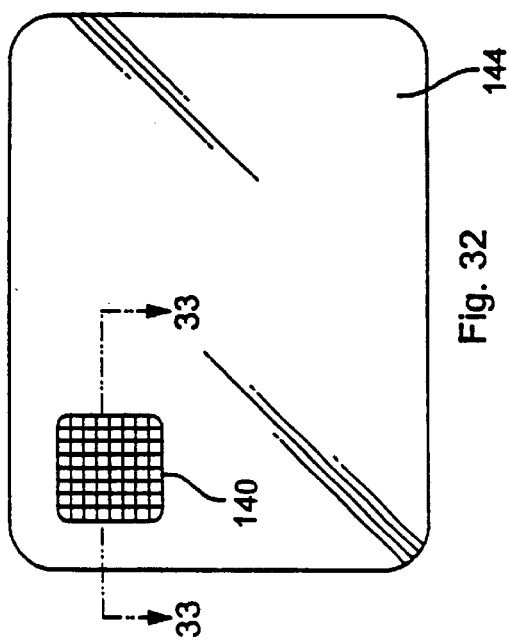
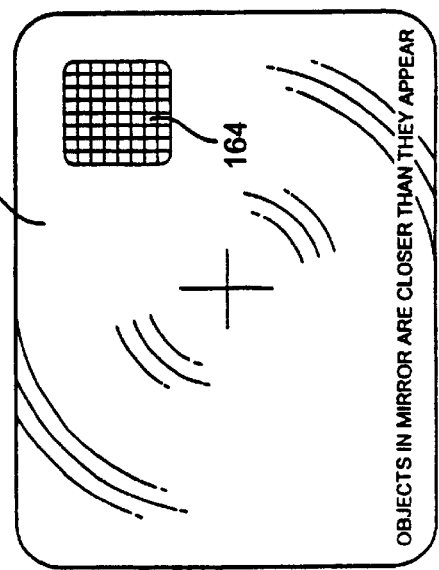
Fig. 33
Fig. 34
Fig. 32
Fig. 35

AUTOMOTIVE REARVIEW MIRROR HAVING A MAIN VIEWING SECTION AND AN AUXILIARY BLINDZONE-VIEWING SECTION

FIELD OF INVENTION

The present invention relates generally to mirrors having multiple surfaces of differing magnification and, particularly, to the application of such mirrors as external side rearview automotive operator aides.

BACKGROUND OF THE INVENTION

Originally, motor vehicles, particularly passenger cars, did not have mirrors to assist the driver. Early in this century however, both inside and outside mirrors were added to automotive vehicles to provide rearward and limited lateral visibility. As the number of vehicles and driving speeds increased, rearward visibility became ever more important.

Today, all passenger cars have a mirror centrally located inside the vehicle. This mirror is the primary mirror. It provides a wide viewing angle, giving an excellent view to the adjacent lanes at a distance of two or more car lengths to the rear. However, it is deficient in that it is unable to view the adjacent lanes at distances of less than one to two car lengths to the rear. In an effort to eliminate this deficiency and to provide rearward visibility when the rear window is blocked, outside mirrors were added to vehicles.

Presently, passenger cars are required by law to have a unit magnification outside rearview mirror on the driver's side. A unit magnification mirror is a plane mirror which produces the same size image on the retina as that which would be produced if the object were viewed directly from the same distance. Furthermore, as provided in Federal Motor Vehicle Safety Standard 111 (FMVSS 111), "The mirror shall provide the driver a field of view of a level road surface extending to the horizon from a line perpendicular to a longitudinal plane tangent to the driver's side of the vehicle at the widest point, extending 8 feet out from the tangent plane 35 feet behind the driver's eyes, with the seat in the rear most position." FMVSS 111 thus effectively determines the size of the mirror, which a manufacturer must provide. The size will vary among different manufacture's vehicles because of the placement of the mirror on the vehicle with regard to the driver's seat location.

Unfortunately, outside mirrors meeting FMVSS 111 still do not provide adequate adjacent lane visibility to view cars that are in the range of one car length to the rear. That is, a blindzone exists where a vehicle is not visible in either the inside mirror or the outside mirror. Even a glance over the shoulder may not be adequate to observe a vehicle in the blindzone. For many vehicles, the door pillar between the front and rear doors obscures the view to the blindzone. Furthermore, this obstruction is not obvious to most drivers, and they may assume that the "over the shoulder glance" has allowed them to see the blindzone when in reality it has not.

Rearward vision in automobiles is mathematically described in a paper published by the Society of Automotive Engineers (SAE) in 1995. That paper is designated as SAE Technical Paper 950601. It is entitled, *The Geometry of Automotive Rearview Mirrors—Why Blindzones Exist and Strategies to Overcome Them*, by George Platzer, the inventor of the present invention. That paper is hereby incorporated by reference.

A common method of overcoming the blindzone is to add a spherically convex blindzone-viewing mirror to the required plane main mirror. Spherically convex mirrors provide a wide field of view, but at the penalty of a reduced image size. However, this may be acceptable if the mirror is only used to indicate the presence of a vehicle in the blindzone and it is not used to judge the distance or approach speed of vehicles to the rear. Simply placing a round segment of a convex mirror on the main mirror surface, as is commonly done with stick-on convex mirrors, does not solve the problem. Doing so can provide a view to the rear which includes the blindzone, but it will also show much of the side of the car, the sky and the road surface, which are distracting and extraneous to the safe operation of the vehicle. What is required is a convex blindzone-viewing mirror that unambiguously shows the driver only the blindzone. In this way, if the driver sees a vehicle in the blindzone-viewing mirror, he knows it is unsafe to move into the adjacent lane. All extraneous and distracting information should be removed from the blindzone-viewing mirror. Furthermore, by eliminating the irrelevant portions of the bullseye mirror, the remaining portion can have a larger radius of curvature, thereby increasing the image size for the given amount of area that is to be allocated to the convex mirror.

Other problems with add-on mirrors are that they:
- may interfere with the requirements of FMVSS 111;
- may substantially decrease the plane main mirror viewing angle;
- a interfere with cleaning, especially when there is ice on it;
- appear as an unsightly excrescence on the main mirror. A blindzone-viewing mirror that is provided by a car manufacturer must not appear to be an afterthought, but rather an integral part of the mirror.

SUMMARY OF THE INVENTION

One object of the present invention is to provide a unit magnification main mirror, which meets the requirements of FMVSS 111 and simultaneously provides a blindzone-viewing mirror having a magnification of less than unity that is in application able to show an automobile driver's side blindzone.

Another object of the invention is to provide a less than unit magnification mirror that meets the requirements of FMVSS 111 on the passenger's side and simultaneously provides a blindzone- viewing mirror having a magnification of less than unity that is able to show the driver the blindzone on the passenger's side.

Yet another object of the invention is to provide a mirror having a combination of two surfaces of different magnification that is not objectionable in appearance.

Still another object of the invention is to provide a mirror having a combination of two surfaces of different magnification that is inexpensive and easy to manufacture.

In a preferred embodiment of the invention, a less than unit magnification mirror is located in the upper and outer region of a unit magnification mirror, and it is optimized in size and orientation to provide only a view of the blindzone while leaving the region surrounding it available to meet the requirements of FMVSS 111. The less than unit magnification mirror is a planar array of reflecting facets simulating the reflection from a spherically convex mirror, and said less than unit magnification mirror is integral with the unit magnification mirror.

BRIEF DESCRIPTION OF THE DRAWINGS

In the drawings, wherein for clarity certain details may be omitted from one or more views:

FIG. 5, is a perspective drawing showing how a less than unit magnification mirror can be placed on the driver's outside mirror to avoid conflicting with the requirements of FMVSS 111 and yet provide a wide angle mirror to observe the blindzone;

FIG. 6, is a front view of the mirror of FIG. 5;

FIG. 7, is side sectional view of the mirror of FIG. 6 in the plane along line 7—7 in the direction of the arrows showing the proper location of the center of the sphere on which the surface of the blindzone mirror lies, so as to produce vertical centering of the image of a vehicle that is in the blindzone;

FIG. 8, is a top sectional view of the mirror of FIG. 6 in the plane along line 8—8 looking in the direction of the arrows showing the proper location of the center of the sphere on which the surface of the blindzone mirror lies, so as to produce horizontal centering of the image of a vehicle that is in the blindzone;

FIG. 11, is a front view of a driver's side mirror embodying the teachings of this invention;

FIG. 12, is an enlarged top sectional view of the mirror of FIG. 11 taken in the plane along line 12—12 in the direction of the arrows;

FIG. 13, is a top view of a circular segment of a spherical mirror;

FIG. 14, is a side view of the mirror of FIG. 13;

FIG. 15, is a top view of the mirror of FIG. 13 wherein the mirror has been cut into square elements;

FIG. 16, is a side sectional view of the mirror of FIG. 15 taken in the plane along line 16—16 looking in the direction of the arrows;

FIG. 17, depicts how the mirror of FIGS. 15 and 16 can be rearranged into a planar array of reflecting facets;

FIG. 18, shows how light is reflected from the mirror of FIG. 14;

FIG. 19, shows how light reflected from the mirror of FIG. 17 simulates the reflections from the mirror of FIG. 14;

FIG. 23, is a diagram comparing the radius of curvature of a front surface mirror to the radius of curvature of a second surface mirror;

FIG. 24, shows another embodiment of a mirror using the teachings of the invention;

FIG. 25, shows an enlarged top sectional view of the mirror of FIG. 24 in the plane along line 25—25 looking in the direction of the arrows;

FIG. 26, shows yet another embodiment of a mirror employing the teachings of the invention;

FIG. 27, is an enlarged top sectional view of the mirror of FIG. 26 in the plane along line 27—27 looking in the direction of the arrows;

FIG. 28, shows still another embodiment of a mirror employing the teachings of the invention;

FIG. 29, is an enlarged top sectional view of the mirror of FIG. 28 in the plane along line 29—29 and looking in the direction of the arrows;

FIG. 30, shows another embodiment of a mirror using the teachings of the invention;

FIG. 31, is an enlarged top sectional view of the mirror of FIG. 30 taken in the plane along line 31—31 looking in the direction of the arrows;

FIG. 32, shows yet another mirror embodying the teachings of this invention;

FIG. 33, is an enlarged top sectional view of the mirror of FIG. 32 taken in the plane along line 33—33 and looking in the direction of the arrows;

FIG. 34, shows another mirror incorporating the teachings of the invention; and

FIG. 35, shows still another mirror incorporating the teachings of the invention.

DETAILED DESCRIPTION OF THE PREFERRED AND ALTERNATIVE EMBODIMENTS

Figure 1:
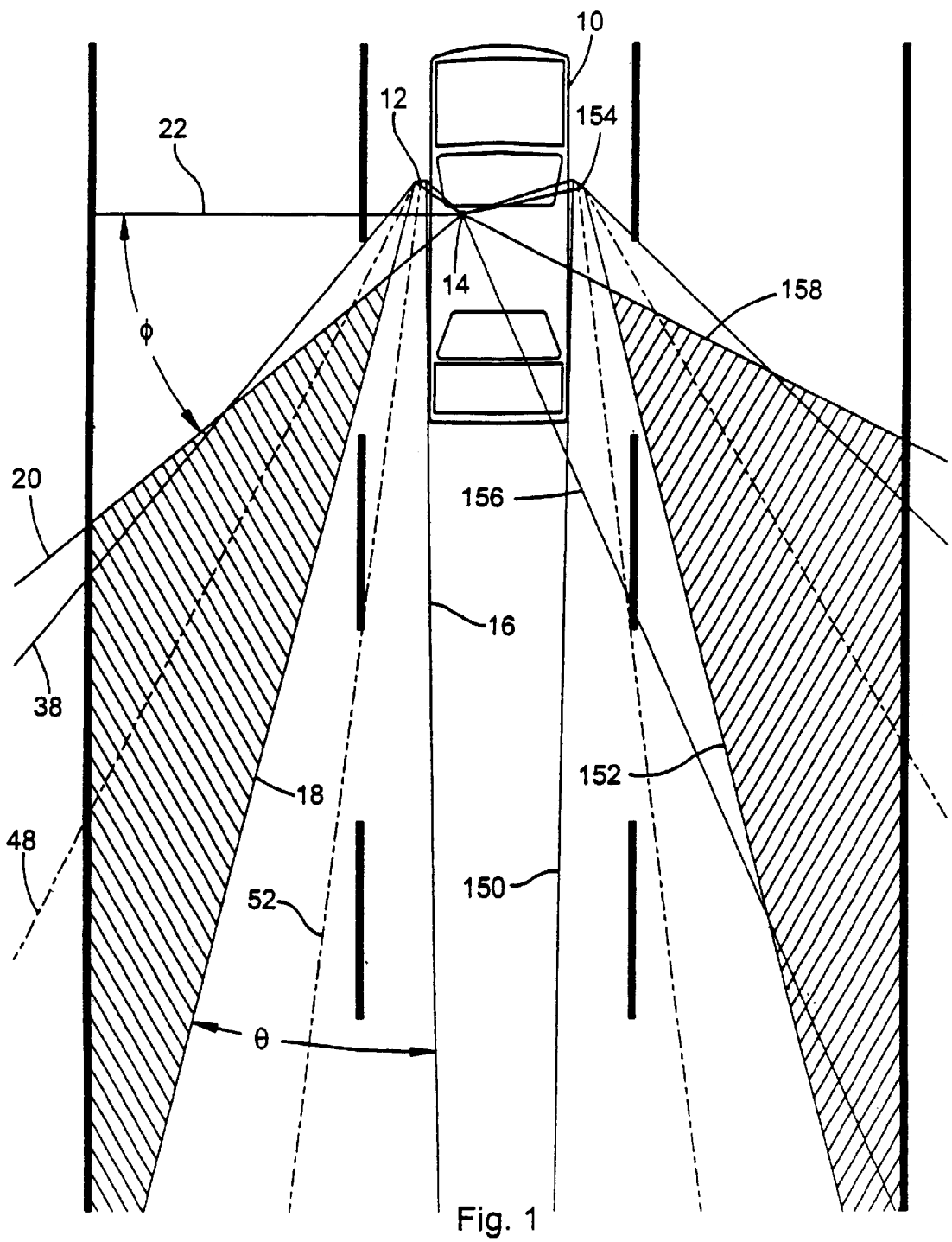
FIG. 1, is a plan view of an automobile on a three-lane highway depicting the field of view of the outside mirrors and the blindzones.

Referring now in greater detail to the drawings, FIG. 1 shows a mid-sized passenger car 10 in the middle lane of a three-lane highway with 12-foot wide lanes. The vehicle 10 is equipped with a driver's side outside mirror 12. The driver's eyes are shown centered at point 14, from which the driver has a field of view to the rear in the horizontal plane encompassing the acute angle formed by lines 20 and 18. Line 20 defines the rearward limit of the driver's peripheral vision when looking at mirror 12. Thus, the area bounded by lines 18 and 20 is a blindzone, shown crosshatched, which cannot be observed in either the driver's direct forward vision or indirectly in the mirror.

SAE Technical Paper 950601 describes the horizontal field of view of a plane mirror in a mathematical equation as a function of the mirror's dimensions and the position of the eyes relative to the mirror. Typically, the angle $\theta$ subtended by lines 16 and 18 is in the order of 15° to 20°. Angle $\theta$ is given by Eq. 1, and it is, $$\theta = 2 \tan^{-1}\left[\frac{w\cos\lambda + D}{2\sqrt{s_L^2 + s_T^2}}\right], \quad \text{Eq. 1}$$

where: w=mirror width;

D=interpupillary distance;

$S_L$=the longitudinal distance along the axis of the vehicle form the driver's eyes to the center of the mirror;

$S_T$=the transverse distance perpendicular to the longitudinal axis from the driver's eyes to the center of the mirror; and $\lambda$½ $\tan^{-1}(S_T/S_L)$.

As described in SAE Technical Paper 950601, the peripheral vision line 20 cannot be precisely located. It depends on the location of the drivers' eyes relative to the mirror 12 and several other factors. For example, Burg (Journal of Applied Psychology/Vol.5/No. 12/1968) has shown that the angular extent of peripheral vision is a function of age. At age 20 it extends 88° from straight-ahead to the side. At 70 years, this angle has dropped to 75°. Angle φ in FIG. 1 is the angle of the peripheral vision line 20 relative to line 22, which is perpendicular to the longitudinal axis of vehicle 10. Typically this angle will be in the range of 40 degrees.

Figure 2:
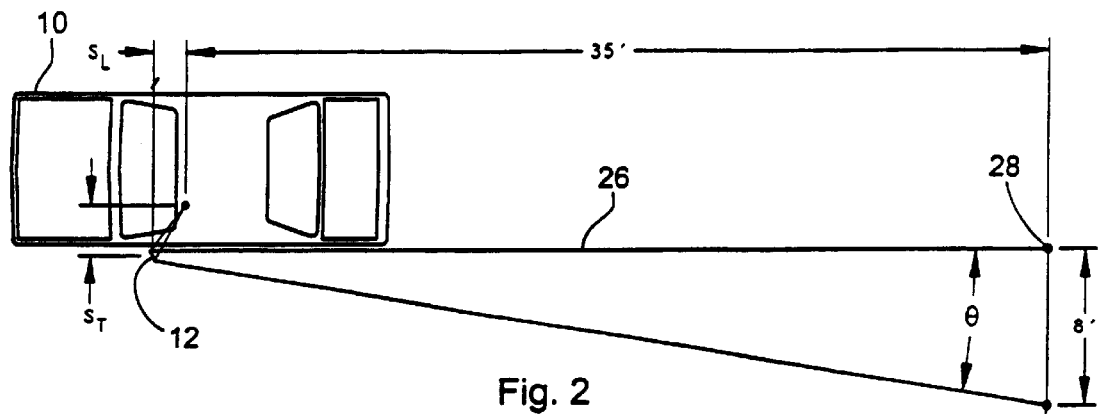
FIG. 2, is a diagram showing the requirements of FMVSS 111 for the horizontal field of view of the driver's outside mirror.

FIG. 2 shows the requirement imposed on the width of mirror 12 by FMVSS 111. As previously stated, the mirror 12 must be able to show a point, as 24, which is 244 cm (8 feet) out from a plane 26 tangent to the side of the vehicle and 1067 cm (35 feet) behind the driver's eyes with the seat in the rear most position. Point 28 is 1067 cm behind the driver's eyes and in plane 26. Points 24 and 28 are on the road surface. Angle θ in FIG. 2 is obviously, $$\theta = \tan^{-1}\left(\frac{244}{s_L + 1067}\right).$$

Eq. 2 Angle θ has a value of about 11.50 for almost any passenger car, and the variation in θ produced by variations in $S_L$ is a second order effect. Hence, the width of the mirror required by FMVSS 111 can be calculated by solving Equation 1 for w. Then, $$w = \frac{2\sqrt{s_L^2 + s_T^2\left(\tan\frac{\theta}{2}\right)} - D}{\cos\lambda}. \quad \text{Eq. 3}$$

Angle θ in this case is equal to 11.50. Using values of $S_L$=45.7 cm, $S_T$=70 cm, and D=6.4 cm, w is found to be 9.4 cm. This value can vary significantly among vehicles, since in Eq.3, $S_L$ and $S_T$ variations no longer produce only second order effects as in Eq. 2. In practice, vehicle manufactures will specify mirror widths in excess of the FMVSS 111 requirements to further reduce the blindzone size.

Figure 3:
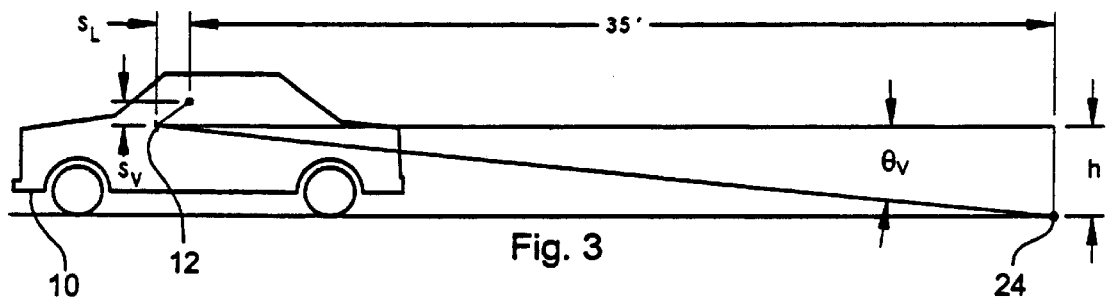
FIG. 3, is a diagram showing the requirements of FMVSS 111 for the vertical field of view of the driver's outside mirror.

FIG. 3 shows the requirements imposed on the vertical dimension of mirror 12 by FMVSS 111. In the vertical plane, vision is monocular since the eyes are not separated as they are in the horizontal plane. SAE Technical Paper 950601 shows that for monocular vision, the interpupillary distance D drops out of Equation 1, so that it becomes, $$\theta = 2\tan^{-1}\left[\frac{w\cos\lambda}{2\sqrt{s_L^2 + s_T^2}}\right]. \quad \text{Eq. 4}$$

Then, $$w = \frac{2\sqrt{s_L^2 + s_T^2 \tan\frac{\theta}{2}}}{\cos\lambda}. \quad \text{Eq. 5}$$

In FIG. 3, h is the height in cm of mirror 12 above the ground, and it can vary significantly from a sports car to a sedan to a van. Angle $\theta_V$ is the angle that determines what the vertical dimension, $w_v$, of mirror 12 must be, in conjunction with the distance of the eye from the mirror. Angle $\theta_V$ replaces angle θ in Equation 5 when calculating the vertical dimension of the mirror. Applying Equation 5 to the required vertical dimension of the mirror, $w_v$, $$w_V = \frac{2\sqrt{s_L^2 + s_V^2 \tan\frac{\theta_V}{2}}}{\cos\lambda_V}, \quad \text{Eq. 6}$$

where: $S_v$=vertical distance in the vertical plane from the eye to the mirror;

$\lambda_V$=½ $\tan^{-1}(S_V/S_L)$; an $$\theta_V = \tan^{-1}\left(\frac{h}{S_V + 1067}\right).$$

Substituting measured values of h, $S_L$, and $S_V$ from one mid-size passenger car gave a value for $w_v$ of 6.4 cm.

The FMVSS 111 requirement for the vertical dimension of the mirror is only a minimum, and it does not provide a satisfactory mirror. Drivers usually set their mirrors so that if the car is on a straight and level road, the horizon will be in about the center of the mirror. This means that if point 24 is to be visible with the horizon centered, the mirror should be about 12.7 cm high. Most passenger car mirrors are not this large vertically, and are closer to 10.2 cm to 11.4 cm. However, the requirements of the standard are met.

Figure 4:
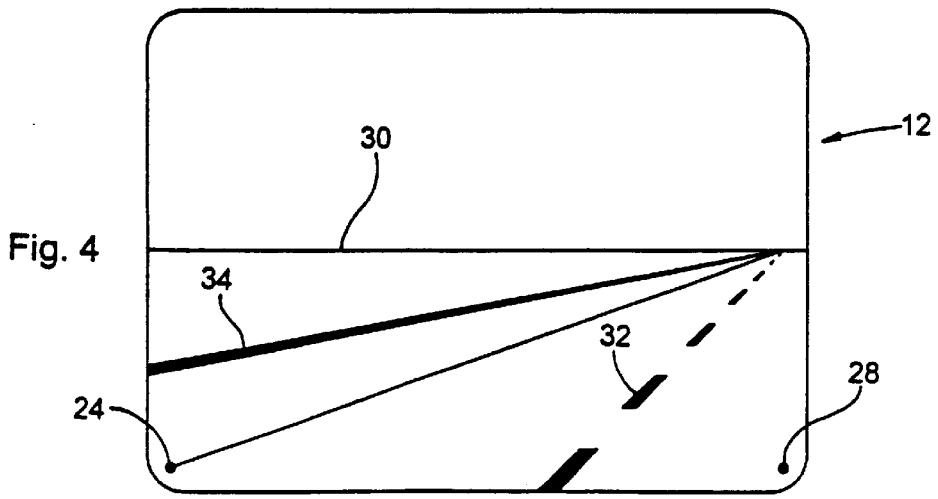
FIG. 4, is an image of the road as seen in the driver's outside mirror showing the effect of the requirements of FMVSS 111 on the horizontal width and the vertical height of the mirror.

FIG. 4 shows mirror 12 adjusted so that the horizon 30 lies at its center. Point 24 is shown in the lower left-hand corner. Also shown is point 28 in the right-hand corner. Line 32 represents the dashed yellow lane marker between the two left lanes. Line 34 represents the left edge of the left lane. Lines 32 and 34 converge at infinity on the horizon. The mirror has been adjusted so that point 28 is just visible, i.e. rotating the mirror farther outward would make point 28 disappear from view.

As previously mentioned, a mirror constructed to just meet the requirement in its horizontal field of view would have an excessively large blindzone. This could be remedied by providing an auxiliary blindzone-viewing mirror of less than unit magnification with a wide field of view, located such that it does not interfere with line 34. Such an auxiliary mirror 36 is shown in FIG. 5 attached to a plane main viewing mirror 40. Mirror 36 is a spherically convex mirror having dimensions and an orientation such that its field of view encompasses the region in FIG. 1 between lines 18 and 38. Mirror 36 can be made small enough so that is does not excessively encroach on the plane area of the main viewing mirror 40 above line 34. For example, if mirror 40 is 10 cm wide, mirror 36 could easily be 4.4×4.4 cm square. Using 4.4 cm as the horizontal dimension for mirror 36, the radius of curvature required to encompass the blindzone can be calculated from another equation in SAE Technical Paper 950601. There it is shown that the field of view of a convex mirror is, $$\theta = 2\left[2\tan^{-1}\frac{w}{2r} + \tan^{-1}w\cos\lambda + \frac{D}{2\sqrt{s_L^2 + s_T^2}}\right]. \quad \text{Eq. 7}$$

All of the variables in Equation 7 are the same as Equation 1 except for r, which is the radius of curvature of the convex mirror. Angle θ in Equation 7 is to be taken as the angle between lines 18 and 38 in FIG. 1. Line 38 is seen to extend from mirror 12 and intersect the peripheral vision line 20 in the center of the adjacent lane. The angle between lines 18 and 38 is about 25°. Using w=4.5 cm, $S_L$=45.7 cm, $S_T$=26.5 cm and D=6.4 cm, r calculates out to be 27.8 cm. Selection of 25° as the blindzone width is partially subjective. It involves the choice of the peripheral vision angle, the positioning of the mirror and an estimate of how much of the geometrically defined blindzone must be included to assure that a driver is able to see a vehicle in the blindzone. In general a radius of curvature in the range of 20 cm to 35cm will be satisfactory depending upon the vehicle.

A key factor in the shaping and positioning of the blindzone-viewing mirror is the required location of the center of the sphere from which the segment is taken. A vehicle in the blindzone should appear centered in the auxiliary blindzone-viewing mirror. FIGS. 6, 7 and 8 comprise a geometric orthographic projection showing the proper orientation of a spherically convex mirror segment 36 relative to a plane mirror 40. A radius 42 and an arc 44 of the sphere from which segment 36 is taken, must pass through the center 46 of the face of segment 36. The location of the center of the sphere must be specified so that centering of the image of a vehicle in the blindzone will occur.

As previously stated, most drivers adjust their mirrors so that if they were on a straight and level road, the horizon would be approximately centered in the mirror. Vertical centering of an image in the blindzone-viewing mirror 36 then requires that the image of the horizon pass through center 46 of mirror 32. This simply requires that radius 42 lie in a plane perpendicular to plane mirror 40, and that the plane also pass through center point 46, as shown in FIG. 7.

Horizontal centering of the view of the blindzone in mirror 36 requires that radius 42 be located such that it passes through center 46 of mirror 36 and also falls along line 48 in FIG. 1 which bisects the acute angle formed by lines 18 and 38. The actual position of radius line 42 in FIG. 8 relative to the vehicle is dependent upon how the driver has positioned the mirror relative to the vehicle. However, the position of line 42 relative to line 50 in FIG. 8 is constant. If the driver is instructed to position the plane mirror so that the side of the car is just visible, the position of line 42 is then effectively constant relative to the side of the vehicle, and the blindzone view is effectively centered about line 48 in FIG. 1.

The field of view in the plane main viewing mirror is θ degrees wide as shown in FIG. 1. If the driver so chooses, he or she could readjust the main viewing mirror so angle θ straddles line 48. Then, the plane mirror view would be centered on the blindzone. Many drivers actually set their mirrors this way to view the blindzone. Since the angle of reflection is equal to the angle of incidence, rotating the field of view outward by say 30°, would require rotating the mirror outward by 15°. Hence, to make the plane mirror look into the center of the blindzone requires that it be rotated by ½ of the angle between line 48 and line 52, where line 52 bisects angle θ. Again selecting the blindzone width as 25°, and using a value of 15° for θ, the field of view would have to be rotated ½ (25°+15°)=20°. This would rotating the mirror 10° to look into the center of the blindzone with the plane mirror.

The same reasoning applies to the convex blindzone-viewing mirror. If radius 42 were perpendicular to the surface of plane mirror 40, the field of view of the convex mirror would be centered about line 52 in FIG. 1. But we want the spherical mirror's field of view to be centered about line 48 when the plane mirror is adjusted to just see the side of the vehicle. Therefore in FIG. 8, line 42 should be at an angle of 10° to line 50. The exact angle chosen will be dependent upon the vehicle and the assumptions made for the position of line 48 in FIG. 1.

Figure 9:
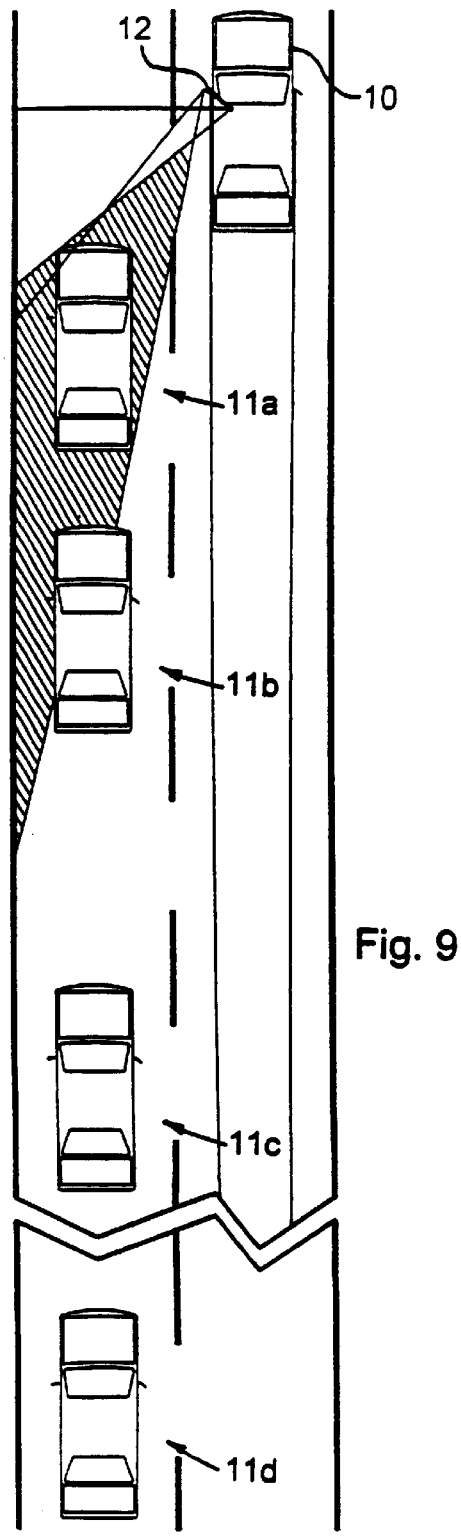
FIG. 9, is a plan view of a two lane highway showing a vehicle in the right lane equipped with the mirror of FIG. 5 and four positions of an overtaking vehicle in the left lane.
Figure 10A:
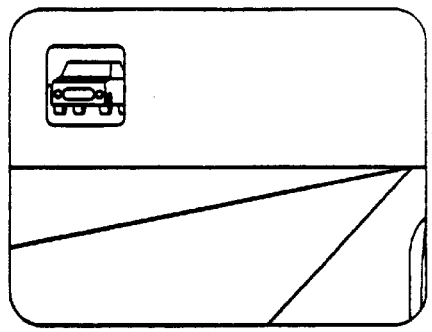
FIG. 10a, shows the image of an overtaking vehicle in FIG. 9, in a mirror like that of FIG. 5.
Figure 10B:
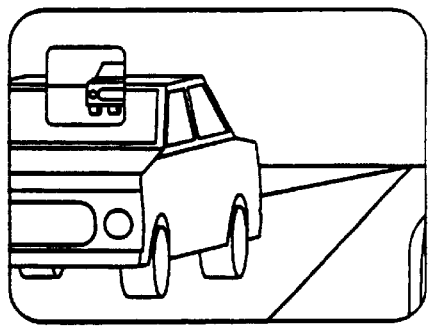
FIG. 10b, is like FIG. 10a except that the overtaking vehicle is farther to the rear.
Figure 10C:
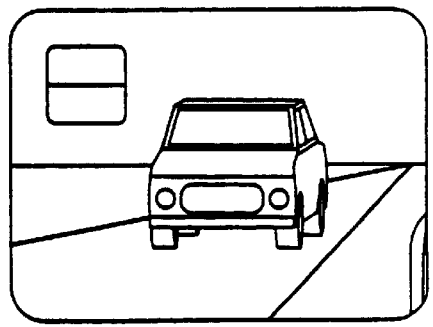
FIG. 10c, is like FIG. 10b except that the overtaking vehicle is farther to the rear.
Figure 10D:
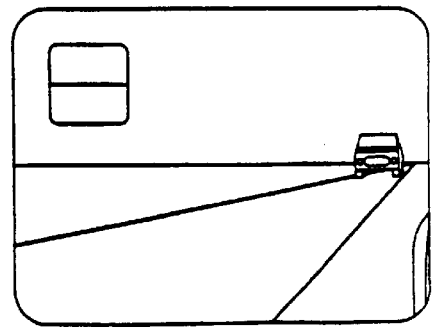
FIG. 10d, is like FIG. 10c except that the overtaking vehicle is farther to the rear.

The criteria required to size, place and orient the less than unit magnification auxiliary blindzone-viewing mirror have now been established. Using these criteria will provide a mirror which conforms with FMVSS 111, centers the image of a vehicle in the blindzone in the less than unit magnification mirror, and optimizes the image size for the space allocated to the less than unit magnification mirror. Mirror 36 in FIG. 5 may be visualized as a spherically convex bullseye mirror wherein all extraneous portions of the bullseye have been removed, leaving only that portion which will show a vehicle in the blindzone. When driving with a mirror so configured, a vehicle overtaking on the driver's side will be seen in the main viewing mirror when the vehicle is to the rear of the blindzone. As the vehicle approaches, it appears to slide outwardly off of main viewing mirror 40 and onto blindzone-viewing mirror 36. FIG. 9 shows an overtaking vehicle at various distances behind vehicle 10 of FIG. 1. FIGS. 10a, 10b, 10c and 10d show the position of the image of the overtaking vehicle on mirror 12 in FIG. 9. FIG. 10d shows the image of the overtaking vehicle at a position 11d in FIG. 9 about 12 car lengths to the rear of vehicle 10. Note that a small portion of the left rear fender of vehicle 10 is seen in the lower right-hand corner of the plane main mirror. FIG. 10c shows the image of the vehicle at a position 11c about 3.5 car lengths to the rear. FIG. 10b shows the image of the vehicle at position 11b about 1.25 car length back, and it is seen mostly in the plane main viewing portion of the mirror, but partially in the auxiliary blindzone-viewing portion. FIG. 10a shows the image of the overtaking vehicle in position 11a, which is entirely in the blindzone, and it is seen that the image is entirely in the blindzone-viewing mirror. Thus, the image of the approaching vehicle moves from inside to outside across the mirror, and this is one reason why the auxiliary mirror is placed in the upper and outer quadrant of the rearview mirror. Placing it on the inner quadrant would disturb the apparent flow of the image of the overtaking vehicle as it moves across the main mirror from inside to outside.

Next, various ways of implementing the combination of the main viewing mirror and the blindzone-viewing mirror will be shown. One simple way is to adhere a glass or plastic segment of a spherically convex mirror to the plane mirror as shown in FIG. 5. However, the stick-on mirror is objectionable in its appearance, its vulnerability to damage, and its interference with cleaning the mirror. It would be highly desirable to reduce its protrusion above the surface of the main mirror. One way of doing this is shown in FIGS. 11 and 12. FIG. 11 is a front view of a plane mirror 54 to which an auxiliary blindzone-viewing mirror 56 has been adhered. Mirror 56 is a planar array of small square reflecting facets that simulate the reflection from a segment of a spherically convex mirror such as the auxiliary blindzone-viewing mirror 36 in FIG. 5. As will be shown, the planar array of reflecting facets provides a very thin mirror compared to the spherically convex mirror it simulates. FIG. 12 is an enlarged top sectional view of mirrors 54 and 56 taken along section line 12—12 in FIG. 11. FIG. 12 shows that the facets are progressively more canted relative to the plane surface of mirror 54 in moving from right to left across mirror 56. For clarity, the facets in FIGS. 11 and 12 are shown larger than they really are. While sixty-four facets are shown, a practical mirror will have several hundred facets, and with that many facets the mirror may be as thin as 0.5 mm.

FIGS. 13 to 17 show the concept of creating a planar array of reflecting facets, which will perform the function of a spherically convex mirror. FIG. 13 is plan view of a spherically convex mirror 58 of the familiar bullseye type having a radius r. FIG. 14 is a side view of mirror 58 showing how it is a solid segment of a sphere of radius R. The surface of mirror 58 is highly polished and has a reflective coating. In FIG. 15, the mirror of FIG. 13 is cut into an array of squares by an imaginary infinitely thin knife. All of the cuts are perpendicular to the base 60 of mirror 58, as shown in FIG. 16, which is a sectional side view of FIG. 15 taken along section line 16—16. Only one material is present in the cross-section, so crosshatching is not used since this would make the drawing confusing.

Next, imagine that we take the mirror of FIG. 15, which is now cut up into an array of square rods, turn it upside down, and let the reflecting ends all drop to the same plane surface. Then the rods are adhered together is some manner at the end opposite the polished end so that the reflecting facets stay in the same plane. Now the array may be turned back over to give the planar array of facets of FIG. 17. In this array of facets, the highest point of each facet is located on a reference plane 62. Notice that the slope of each facet in FIG. 17 has the slope of each corresponding segment in FIG. 16. FIGS. 18 and 19 correspond with FIGS. 14 and 17 redrawn to show that the convex mirror and the planar array of facets reflect light in the same way. Parallel light rays reflecting off of corresponding points on the two mirrors reflect in the same direction. For example, ray 64 reflects off of point 66 as ray 68, and ray 70 reflects off of point 72 on the facet as ray 74 which is parallel to ray 68. Likewise, rays 76 and 82 reflect off of points 78 and 84 as parallel rays 80 and 86.

Mirror 58 in FIG. 18 and the planar array of FIG. 19 would correspond exactly if the number of facets could be made infinite. With finite dimensions, there will be some distortion, and the array pattern will be discernible. However, a very good approximation is produced with facets that are in the order of 0.5 mm to 1.5 mm square.

The planar array of facets shown in FIG. 19 simulates the convex bullseye mirror of FIG. 14. Any portion of convex bullseye mirror 58 may be simulated by a planar array of facets. For example, the convex mirror 36 of FIG. 5, which is actually a portion of a bullseye mirror, is easily represented by a planar array.

To show the principal of the planar array of reflecting facets, a convex mirror was imagined being cut up into square elements with an infinitely thin knife. Of course this cannot be done in the real world, but there are practical ways of fabricating such an array. One way is to assemble a group of square steel wires held together by a frame. The wires may be, for example, 3 cm or so long and 0.75 mm square. One end of the assembly is machined to the desired convex shape and then polished to a mirror finish. Next, the pressure on the frame is released just enough to be able to push the machined and polished ends to same plane. The assembly may be re-secured by a variety of methods. Such an assembly can be used in a plastic injection mold to replicate the surface, or it might be used to press the pattern into a plastic or glass surface. The surface of the replica is then coated with a reflective metal by one of several common methods such as sputtering, vacuum deposition or chemical deposition.

The choice of material used for the square wires depends upon the application. For short run injection molding, aluminum wire could be used. For greater durability in an injection mold, hard steel is required.

The assembly just described was machined to a convex shape. Any replication in another surface formed by the assembly is the negative of the machined surface. That is, looking directly at the pressed or molded surface produced by a convex surface would appear as a concave surface. However, if the pattern is pressed into a thin sheet of transparent plastic or glass and the pattern is viewed through the glass or plastic, it appears as a convex mirror.

Depending upon whether a first surface convex mirror (the reflective coating is on the front or first surface) is desired, or if a second surface convex mirror (the reflective coating is on the back or second surface) is desired, determines if the rod assembly is machined convex or concave. Obviously, a tool used to form a convex mirror on a first surface mirror should be machined concave. Likewise, a tool used to form a convex mirror on a second surface mirror should be machined convex.

While the planar array just described used square facets, other arrays of facets may be used. For example, a circular array may be used. Part of the method used to make a Fresnel lens could be used to make a convex mirror. Fresnel lenses are made by machining very narrow concentric rings in a soft metal with a special diamond tool. The surface of each ring is slightly canted relative to the plane of the lens. As the rings progress outward from the center, the cant angle increases. At the center the cant angle is zero, and at the outer edge of the lens the cant angle may be for example 30°. A section through the center of a Fresnel lens will look like the section of FIG. 17. The machined rings are used to press the ring pattern into a transparent plastic. The surface can then be converted to a mirror by applying a reflective coating to it. As with the planar array of square facets, the mirror 36 which is a portion of a bullseye mirror, may be simulated by using a portion of a Fresnel bullseye pattern. That is, the mirror 36 could be simulated by segments of concentric circular rings.

Having developed the concept of the planar array of reflecting facets, various ways of using such an array will be shown. While arrays of squares are shown in these examples, it should be understood that any suitable type of array might be used. FIG. 11 has already shown a planar array 56 adhered to mirror 54. The array in this case is molded or pressed into a thin plate of a thermoplastic material. The thermoplastic plate can be quite thin. The thickness depends on the number of facets per square centimeter. Referring to FIG. 19, it is obvious that if more facets are used to simulate the convex mirror of FIG. 16, the depth of the facets will decrease. For example, with facets that are 0.75 mm square, the maximum depth of the edge facets will be in the range of 0.05 mm. Thus, array mirror element 56 in FIG. 12 can have a thickness in the range of 0.5 mm thick and still provide adequate material in which to form the 0.05 mm deep facets.

Figure 21:
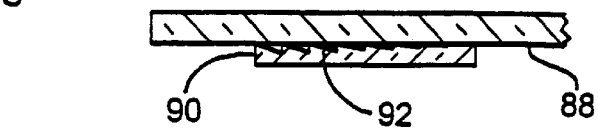
FIG. 21, is an enlarged side sectional view of the mirror of FIG. 20 taken in the plane along line 21—21 and looking in the direction of the arrows.
Figure 20:
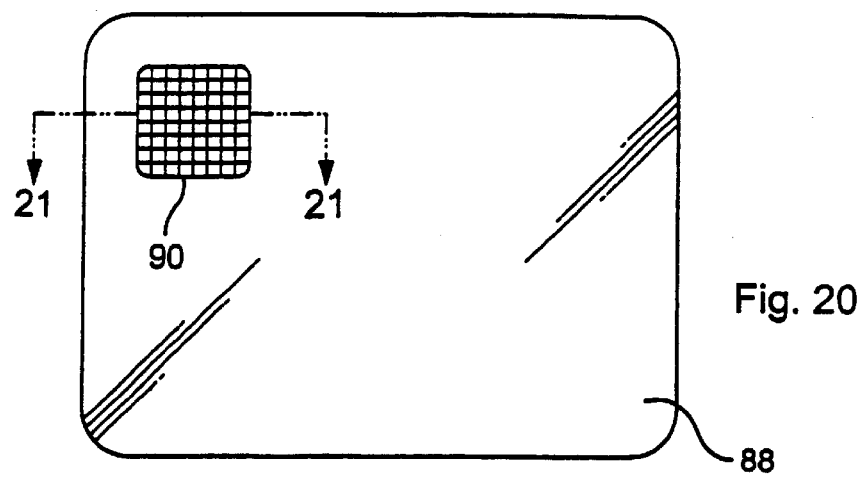
FIG. 20, shows a mirror alternatively embodying the teachings of the invention.

FIG. 20 is a front view of a plane main viewing mirror 88 to which an auxiliary blindzone-viewing mirror 90 has been adhered. Mirror 90 in this embodiment is a thin second surface planar array of reflecting facets as opposed to the first surface planar array of FIG. 11. FIG. 21 is an enlarged top sectional view of mirrors 88 and 90 taken along the section line indicated by 21—21 in FIG. 20. Here, the material of array mirror 90 must be transparent, being glass or plastic. If a plastic is used, it should be one of the optical grade plastics, e.g.: an acrylic such as Lucite manufactured by E.I. du Pont; a polycarbonate such as Lexan manufactured by General Electric; or a cyclic olefin copolymer such as Topas manufactured by the Ticona division of Hoechst. The facets formed in the thin plate of mirror 90 have a reflective metal coating 92 applied to them. Also, if mirror 90 is implemented in a plastic material, its plane first surface may be protected by an optically transparent abrasion resistant coating such as a siloxane. Several companies including G. E. Silicones (Waterford, N.Y.) and Dow Chemical Co (Midland, Mich.) manufacture siloxanes used as transparent hardcoats on plastics. This embodiment has the advantage of protecting the faceted surface and its reflective coating.

Any second surface faceted mirror will produce additional deviation of an incident ray of light due to the fact that the front surface of the glass or plastic and the reflecting second surface of the material are not parallel. In fact, the glass or plastic between the front and back surfaces form a prism. As is well known, a prism produces a deviation of an incident ray which is proportional to the prism angle and the index of refraction of the material of which the prism is composed. Thus, the deviation of a ray caused by a second surface faceted mirror varies from facet to facet, and it is necessary compensate the mirror for this deviation by changing the prism angles relative to the flat front surface.

Figure 22:
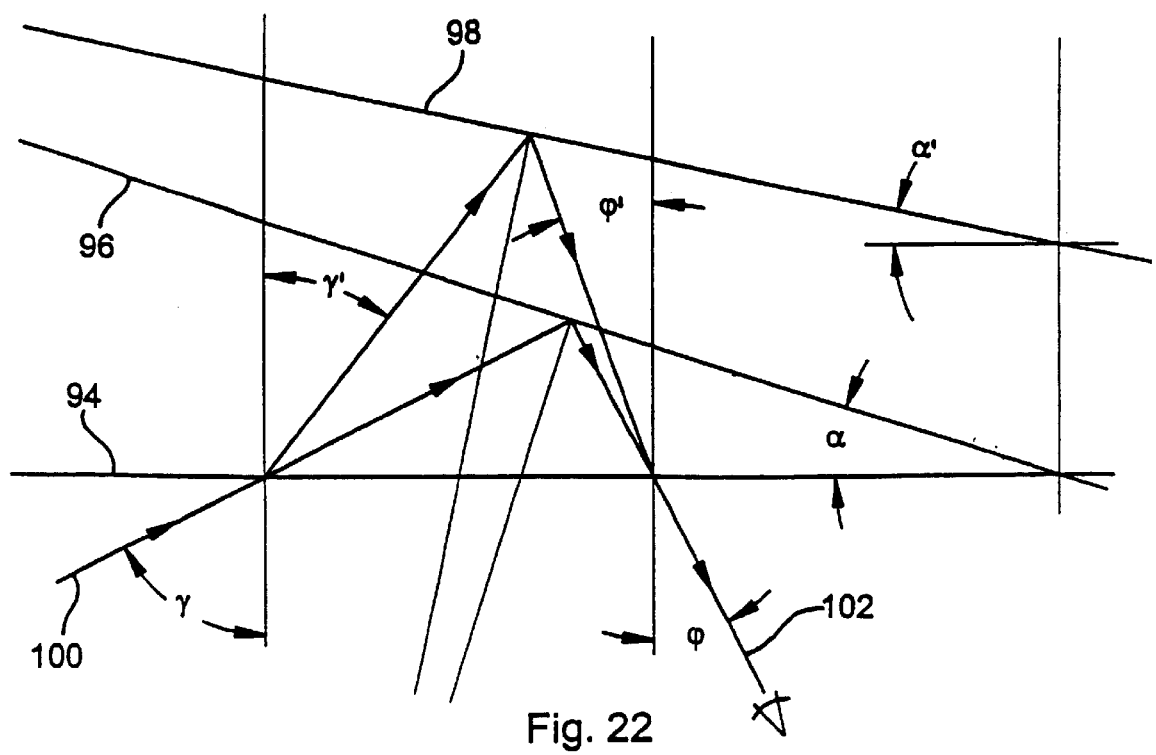
FIG. 22, is a diagram comparing a directly reflected ray from a front surface mirror to a refracted ray from a second surface mirror.

If the faceted second surface mirror of FIG. 21 is to have the same field of view as the first surface mirrors of FIGS. 5, 6, 7, 8 and 12, it can be shown that to a first approximation, its element's angles should correspond to those of a convex mirror similar to that of FIG. 5, except that radius 42 in FIGS. 7 and 8 should be greater by a factor of $\mu$, the index of refraction of the glass or plastic, and the angle $\beta$ between lines 42 and 50 in FIG. 8 should be less by a factor of $1/\mu$. This results from the fact that the angle of a second surface facet mirror element relative to the plane of the front surface of the thin plate in which the faceted mirror has been formed must be less than the angle of a corresponding element on a first surface faceted mirror due to refraction. FIG. 22 shows why this is so. Here, a line 94 represents the edge a plane parallel to the plane of the unity gain mirror to which the faceted mirror is adhered. Line 96 is a first surface mirror element at an angle $\alpha$ to line 94, and line 98 is a second surface mirror element at an angle $\alpha'$ to line 94. Line 100 represents a ray of light that reflects off of surface 96, becoming ray 102 going to an observer's eye. Line 100 is at an angle $\gamma$ to the perpendicular to line 94. Line 102 is at an angle $\varphi$ to the perpendicular to line 94. Knowing that the sum of the angles in a triangle is 180°, it is seen that for the first surface mirror, $$\alpha = \frac{\gamma - \varphi}{2}. \quad \text{Eq. 8}$$

For the second surface mirror, the region between lines 94 and 98 is a refracting medium having an index of refraction $\mu$. Ray 100 is refracted at line 94 such that the angle of refraction, $\gamma'$, is related to incident angle $\gamma$ by the familiar equation, $$\frac{\sin\gamma}{\sin\gamma'} = \mu. \quad \text{Eq. 9}$$

Solving for $\gamma'$, $$\gamma' = \sin^{-1}\left(\frac{\sin\gamma}{\mu}\right). \quad \text{Eq. 10}$$

The refracted ray reflects off of surface 98, and at line 94 again undergoes refraction, emerging along line 102. In leaving the refractive medium at line 94, the ray bends away from the perpendicular to line 94, so that, $$\varphi' = \sin^{-1}\left(\frac{\sin\varphi}{\mu}\right). \quad \text{Eq. 11}$$

Again using the geometry of triangles, it can be shown that $$\alpha' = \frac{\gamma' - \varphi'}{2}. \quad \text{Eq. 12}$$

Substituting Eq. 10 and 11 into Eq. 12, $$\alpha' = \frac{1}{2}\left[\sin^{-1}\left(\frac{\sin\gamma}{\mu}\right) - \sin^{-1}\left(\frac{\sin\varphi}{\mu}\right)\right]. \quad \text{Eq. 13}$$

Using the power series expansion for the arcsine and sine, and assuming $\gamma$ and $\varphi$ are small, $$\alpha' \cong \frac{1}{2}\left(\frac{\gamma}{\mu} - \frac{\varphi}{\mu}\right) \cong \frac{1}{\mu}\left(\frac{\gamma - \varphi}{2}\right) \cong \frac{\alpha}{\mu}. \quad \text{Eq. 14}$$

Hence, to a first approximation, the angle of a given facet on a second surface mirror is reduced by a factor of $1/\mu$ compared to a corresponding facet on a first surface mirror.

Since the angle of each facet on a second surface mirror is reduced by a factor of $1/\mu$, this obviously increases the spherical radius of the second surface mirror as compared to the first surface mirror. In fact, we can guess that the radius is increased by a factor of $\mu$, but to verify this, let's return to FIG. 8 and examine the top view of mirror 36 repeated in FIG. 23. Arc 44 includes the surface of the front surface spherical mirror 36 in FIG. 8. That sphere is centered at point 104 and it has a radius indicated by line 42. Line 42 is at an angle $\beta$ to line 50, which is perpendicular to mirror 40. If a second surface mirror is to produce the same view as mirror 36, $\beta$ must be reduced by a factor of $1/\mu$ since radii 42 and 110 are respectively perpendicular to arcs 44 and 112 at point 46, and the lines tangent to arcs 44 and 112 at point 46 are related by Eq. 14. Hence, the radius 110 of the sphere generating the second surface mirror must be at an angle $\beta/\mu$ to line 50, and its center 108 must lie on line 114 for arc 112 to pass through point 46 in the direction of line 110. Second surface 106 must be interpreted in view of second surface 134 in FIG. 31. In FIG. 23, a refracting medium is not shown in front of surface 106 since the drawing would then become confusing. Since spherical arcs 44 and 112 both pass through point 46, and both spheres are symmetrical about axis 114, then, $$d = R\sin\beta = R'\sin\frac{\beta}{\mu}, \quad \text{Eq. 17}$$

where: d=the distance between line 50 and line 114;
R=radius 42 of first surface mirror 36; and
R'=radius 110 of second surface mirror 106. Solving for R', $$R' = R\frac{\sin\beta}{\sin\frac{\beta}{\mu}}. \quad \text{Eq. 18}$$

Again using the power series approximation, $$R' = \mu R. \quad \text{Eq. 19}$$

Equation 16 and Equation 19 are approximations. Accurate values of α' and R' are obtained using a computer solution.

FIGS. 24 and 25 show another embodiment of this invention wherein a faceted mirror 116 is adhered to the back of a first surface plane mirror 118. FIG. 24 is a front view of mirror 118. FIG. 25 is an enlarged top sectional view of mirrors 116 and 118 taken along section line 25—25 in FIG. 24. Since mirror 118 is a first surface mirror having a reflective coating 120 on the front surface, the metallization in front of mirror 116 must be removed for mirror 116 to be visible from the front. Thus, a window 122 in the metallization is provided for this purpose. The faceted mirror 116 is a second surface mirror, and it is adhered to mirror 118 with a clear adhesive, preferably having an index of refraction near that of the glass to avoid reflections at the adhesive interface. An example of such an adhesive is an ultraviolet cured acrylic adhesive manufactured by the Loctite Corporation of Rocky Hill, Conn. This particular product is designated as their 3494 adhesive, and it has an index of refraction of 1.48. The embodiment shown in FIGS. 24 and 25 provides protection for the faceted mirror and keeps the plane mirror a first surface mirror, which is the common type of mirror in use. The arrangement shown in FIGS. 24 and 25 could also be implemented with mirror 118 being a second surface mirror.

FIGS. 26 and 27 are like FIGS. 24 and 25, and like elements are identified with like reference numbers. The difference lies in the fact that the adhered faceted mirror 124 has the facets formed on the inner face. Here, care must be taken to assure that the clear adhesive is applied so that no air is trapped between the main mirror 118 and auxiliary blindzone-viewing mirror 124 since air bubbles would interfere with the reflections seen. This arrangement provides additional protection for the facets. It should be noted that with this arrangement of using a clear adhesive uniformly applied between the facets and the back surface of mirror 118, mirror 124 becomes a second surface mirror. Additional care must be taken when designing this mirror since the glass and the adhesive may have different indices of refraction. Mirror 124 could also be adhered only along its perimeter, in which case it is optically a first surface mirror in the sense that the angle of a reflected ray is not influenced by the refraction that occurs as the ray passes through 118.

FIGS. 28 and 29 are also like FIGS. 24 and 25, and again like elements are denoted by like reference numbers. The difference here is that the faceted blindzone-viewing mirror has been replaced by solid clear plastic element 126 having a spherically concave rear face with a reflective coating 128. It is also adhered to the main viewing mirror 118 with a transparent adhesive, again having an index of refraction near that of the glass and the plastic to minimize reflections at the plane of the adhesive. Mirror surface 128 is viewed through window 122 where it is seen as a spherically convex mirror. The advantage of this embodiment is that use of the planar array can be avoided in those applications where there is adequate space behind the main viewing mirror 118 to accommodate the volume of element 126 without interfering with the mirror positioning mechanism.

FIGS. 30 and 31 show a rearview mirror 130 formed in a transparent material wherein a concave portion is molded integrally with a plane portion. The entire back surface of mirror 130 is coated with reflective material so that mirror 130 is a second surface mirror. FIG. 30 is a front view of mirror 130. Area 132 is the region in which concave portion 134 is visible. FIG. 31 is an enlarged top sectional view of mirror 130 taken along section line 31—31 in FIG. 30. In FIG. 30, concave surface 134 appears as a segment of a spherical convex mirror lying in region 132 when viewed from the front. Second surface 136 appears as a plane mirror when mirror 130 is viewed from the front. The advantage of this embodiment is that the use of adhesives is avoided, and it is a single component.

FIGS. 32 and 33 depict a mirror 138 having a faceted blindzone-viewing portion 140 formed integrally with a plane main viewing portion. The entire back surface of mirror 138 has a reflective coating 142, making it a second surface mirror. FIG. 32 is a front view of mirror 138, showing faceted portion 140 and plane portion 144. FIG. 33 is an enlarged top sectional view of mirror 138 taken along the section line indicated by 33—33. Faceted portion 140 is formed in the material of which mirror 138 is made. Mirror 138 may be plastic or glass. It may be a molding, or the facets may be pressed into sheet stock. If the material of 138 is a plastic, the front surface may be protected with a hardcoat as previously described. The advantage of this embodiment is that it requires no additional space, and the current mirror glass can be directly replaced with mirror 138.

Preferably, the faceted portion 140 in FIG. 32 should have as high a reflectivity as possible, being coated with aluminum or silver. Since the blindzone-viewing portion is a second surface mirror, the first surface will have a reflection of about 4%, which will be faintly visible over the reflection from the blindzone-viewing portion. The two reflections are in different directions, and are of different magnifications. By keeping the reflection from the less than unit magnification mirror as high as possible, the reflection from the first surface is less noticeable. This applies to any of the embodiments utilizing a second surface blindzone-viewing mirror.

FIG. 34 shows a truck type of mirror incorporating some of the principles described above. Most truck mirrors are taller than they are wide as indicated in FIG. 34. Many of these mirrors use a large bullseye convex mirror attached at the lower end to increase the horizontal field of view so that the blindzone may be seen. FIG. 34 shows a convex faceted mirror 146 on the lower end of a main unit magnification mirror 148. Mirror 146 has been optimized to view primarily the blindzone. Any of the methods described above may be used to form the mirror of FIG. 34.

The passenger's side outside mirror is also subject to restrictions imposed by FMVSS 111. Because that mirror is so far away from the driver, the field of view of a unit magnification mirror of the same size as the mirror on the driver's side would be only about 10°. This would result in a very large blindzone on the passenger's side. For this reason, FMVSS 111 allows a convex mirror having a wider field of view to be used. This of course reduces the size of the images seen in the mirror. FMVSS 111 says that the radius of curvature used on passenger's side mirrors "shall be not less than 34 inches and not more than 65 inches." It also requires that the mirror be inscribed with the statement, "Objects in Mirror are Closer Than They Appear." At a radius of curvature of 1651 mm (65 inches), the magnification is about 0.30, and the field of view is about 27°. A radius of curvature of 1016 mm (40 inches) is in common use. Using the largest possible radius of curvature increases the image size, but it also increases the size of the blindzone.

Returning to FIG. 1, lines 150 and 152 define the viewing angle of a 1651 mm radius convex mirror 154. When the driver is looking at mirror 154, the peripheral vision line is approximately shown by line 156. However, because passengers and the vehicle structure block the driver's peripheral vision to the road, the peripheral vision line cannot be used to define the blindzone as on the driver's side. A line 158 extending from the driver's eyes through the right rear door window is about the limit of the driver's vision to the rear. A blindzone then exists between lines 152 and 158, and it is shown crosshatched. This blindzone may be removed by providing an auxiliary blindzone-viewing mirror as in FIG. 5, except that such an auxiliary mirror must be placed in the upper right hand corner, as shown in FIG. 35.

In FIG. 35, a passenger's side mirror 160 has a surface 162 that is a spherically convex mirror having a radius of curvature falling within the requirements of FMVSS 111, and mirror 164 is a less than unit magnification mirror designed to view generally only the blindzone. Mirror 164 should have a field of view encompassing the region between lines 152 and 158, and that will require a field of view in the range of 25 to 30 degrees. If a width for mirror 164 is chosen to be 4.5 cm and its viewing angle is to be 25 degrees, its required radius of curvature calculated from Eq. 7 is 23 cm.

While being able to use the largest possible radius of curvature for mirror 164 is an advantage, the main advantage of having a right side blindzone-viewing mirror is that such a mirror unambiguously tells you that you cannot change lanes if a vehicle is visible in that mirror. Without the blindzone viewing mirror, it is necessary to try to judge the position of a vehicle seen in a mirror which has an image size ⅓ of that in direct vision. Mirror 160 can be implemented by any of the arrangements used on the driver's side mirror. And obviously, main viewing mirror 162 which is also a less than unit magnification mirror, may be implemented as a planar array of reflecting facets, with or without the blindzone-viewing mirror.

The invention in its broader aspects is not limited to the specific details shown and described, and departures may be made from such details without departing from the principles of the invention and without sacrificing its advantages. For example, the present invention can be applied in other applications such as heavy off-road vehicles and the like where a clear unobstructed wide field of view is required for safe operation, and yet the size of the mirror must be limited.

What is claimed is:

1. A mirror for automotive rearview application comprising:
    a main viewing outside mirror and an auxiliary blindzone viewing mirror, said auxiliary blindzone viewing mirror defining a reflective surface comprised of a planar array of reflecting facets simulating a convex mirror and having a radius of curvature and a magnification less than that of said main viewing outside mirror, wherein said auxiliary blindzone viewing mirror is located generally in an upper and outer quadrant of said main viewing outside mirror, and said radius of curvature of said auxiliary blindzone viewing mirror lies in a plane general perpendicular to said main viewing outside mirror, and said plane passes through the center point of said auxiliary blindzone viewing mirror so that its viewing angle primarily encompasses the region between the outer limit of the viewing angle of said main viewing outside mirror and the rearward limit of the driver's peripheral vision when said driver is looking at said mirror.

2. The mirror of claim 1, wherein said main viewing outside mirror and said auxiliary blindzone-viewing mirror are both first surface mirrors.

3. The mirror of claim 1, wherein said main viewing outside mirror is a first surface mirror and said auxiliary blindzone-viewing mirror is a second surface mirror.

4. The mirror of claim 1, wherein said main viewing outside mirror and said auxiliary blindzone-viewing mirror are both second surface mirrors.

5. The mirror of claim 1, wherein said auxiliary blindzone-viewing mirror is a separate element attached to said main viewing outside mirror.

6. The mirror of claim 1, wherein said main viewing outside mirror and said auxiliary blindzone-viewing mirror are an integral structure.

7. The mirror of claim 6 wherein said mirror is protected with an optically transparent hardcoat.

8. The mirror of claim 1, wherein said reflecting facets are formed in an optically transparent material.

9. The mirror of claim 1, wherein said reflecting facets are squares lying in a plane generally parallel the main viewing outside mirror and each square being a segment of convex mirror.

10. The mirror of claim 9, wherein the facet squares have sides dimensioned in the range of 1.5 mm to 0.5 mm.

11. The mirror of claim 1, wherein said reflecting facets are segments of concentric circular rings.

12. The mirror of claim 11, wherein the width of said rings is in the range 1.5 mm to 0.2 mm.

13. The mirror of claim 1, wherein the characteristic reflectivity of said auxiliary blindzone viewing mirror is greater than the characteristic reflectivity of said main viewing outside mirror.

14. The mirror of claim 1, wherein said main viewing outside mirror is a first surface mirror and said auxiliary blindzone-viewing mirror is attached to a back surface of said main viewing outside mirror, said auxiliary blindzone-viewing mirror, in application, being viewed through a region of said main viewing outside mirror which is devoid of reflective material.

15. A mirror for automotive rearview application comprising:
    a main viewing outside mirror and an auxiliary blindzone viewing mirror, said auxiliary blindzone viewing mirror defining a segment of a convex mirror having a radius of curvature and a magnification less that that of said main viewing mirror and located behind a first surface of said main viewing outside mirror, wherein said auxiliary blindzone viewing mirror is located generally in an upper and outer quadrant of said main viewing outside rearview mirror, and said radius of curvature of said auxiliary blindzone viewing mirror lies in a plane generally perpendicular to said main viewing outside rearview mirror, and said plane passes through the center point of said auxiliary blindzone viewing mirror so that its viewing angle primarily encompasses the region between the outer limit of the viewing angle of said main viewing outside mirror and the rearward limit of the driver's peripheral vision when said driver is looking at said mirror.

16. The mirror of claim 15, wherein said main viewing mirror is a first surface mirror and said auxiliary blindzone viewing mirror is attached to a back surface of said main viewing mirror and, in application, viewed through a region of said main viewing outside mirror which is devoid of reflective material.

17. The mirror of claim 15, wherein said auxiliary blindzone-viewing mirror is a second surface mirror.

18. The mirror of claim 15, wherein said main viewing outside mirror and said auxiliary blindzone-viewing mirror are an integral structure.

19. The mirror of claim 15, wherein said main viewing outside mirror and said auxiliary blindzone-viewing mirror are both second surface mirrors.

20. The mirror of claim 15, wherein the characteristic reflectivity of said auxiliary blindzone-viewing mirror is greater than the characteristic reflectivity of said main viewing outside mirror.

21. An auxiliary blindzone viewing mirror for attachment to an automotive outside rearview mirror wherein said blindzone viewing mirror is comprised of a thin plate in which a planar array of reflecting facets has been formed, said planar array of reflecting facets simulating a convex mirror wherein said auxiliary blindzone viewing mirror having a radius of curvature and a magnification less that that of said main viewing mirror and located generally in an upper and outer quadrant of said outside rearview mirror, and said radius of curvature of said auxiliary blindzone viewing mirror lies in a plane generally perpendicular to said outside rearview mirror, and said plane passes through the center point of said auxiliary blindzone viewing mirror so that its viewing angle primarily encompasses the region between the outer limit of the viewing angle of said outside mirror and the rearward limit of the driver's peripheral vision when said driver is looking at said mirror.

22. The mirror of claim 21, wherein said thin plate is optically transparent and said planar array is formed in the second surface of said thin plate, and said thin plate is adhesively attached to said outside rearview mirror.

23. The mirror of claim 21, wherein said thin plate comprises a thermoplastic material.

24. The mirror of claim 22, wherein the front surface of said thin plate is protected with an optically transparent abrasion resistant coating.

* * * * *